No. 675,356. Patented May 28, 1901.
G. W. MACKENZIE.
GAS STRAINING AND COOLING APPARATUS.
(Application filed July 11, 1900.)
(No Model.)
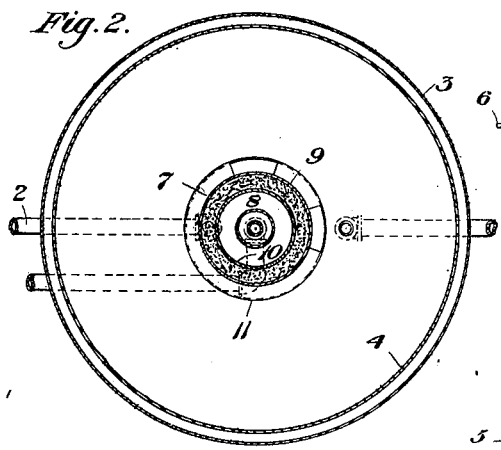
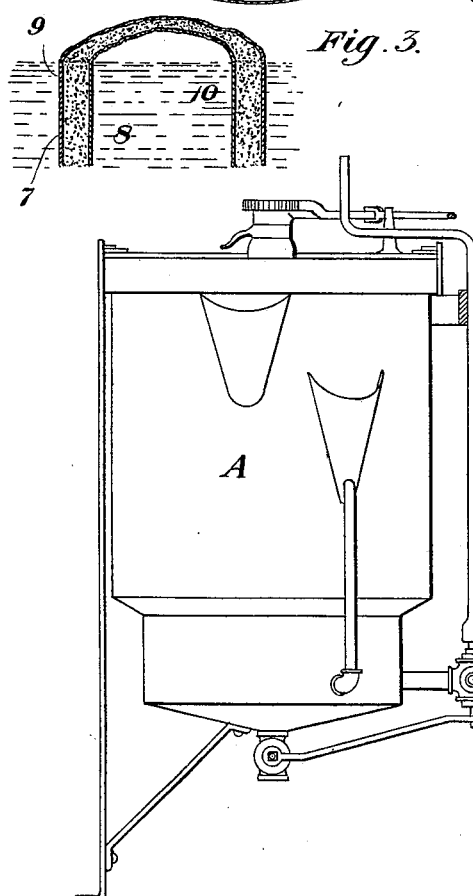
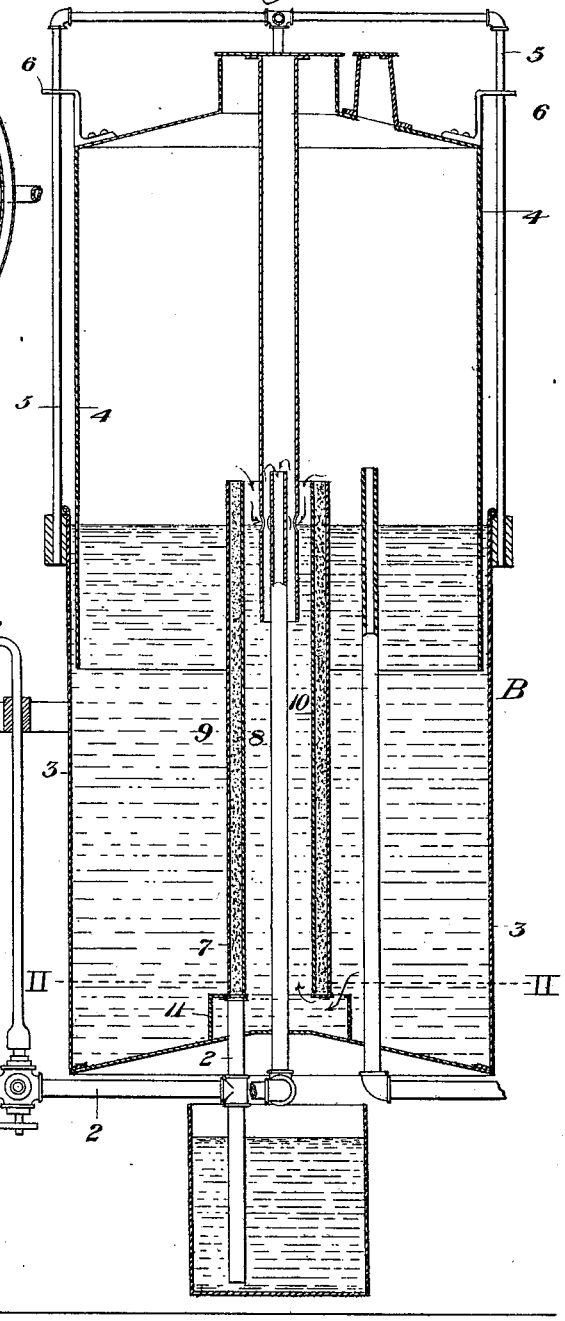
Witnesses:
J. H. Moore.
R. H. Tayman.
Inventor:
George W. MacKenzie
by C. M. Clarke
his Attorney.
THE NORRIS PETERS CO., PHOTO-LITHO., WASHINGTON, D. C.

United States Patent Office.

GEORGE W. MacKENZIE, OF BEAVER, PENNSYLVANIA.

GAS STRAINING AND COOLING APPARATUS.

SPECIFICATION forming part of Letters Patent No. 675,356, dated May 28, 1901.

Application filed July 11, 1900. Serial No. 23,221. (No model.)

*To all whom it may concern:*

Be it known that I, GEORGE W. MACKENZIE, a citizen of the United States, residing at Beaver, in the county of Beaver and State of Pennsylvania, have invented certain new and useful Improvements in Acetylene-Gas Straining and Cooling Apparatus, of which the following is a specification, reference being had to the accompanying drawings, forming part of this specification, in which—

Figure 1 is a side elevation of my improved acetylene-gas generating and storing apparatus, the generating-department being shown in elevation, while the storage-department is in vertical section. Fig. 2 is a horizontal cross-sectional view taken on the line II II of Fig. 1. Fig. 3 is a detail view of a portion of the strainer and cooler.

My invention relates to apparatus for storing, straining, and cooling acetylene gas; and it consists in the mechanism substantially as shown in the drawings and hereinafter described.

Referring to the drawings, A is the generator, from which a pipe 2 conveys the gas to the holder B, wherein it is strained, cooled, and stored. The holder consists of the usual outer shell 3 and the inner bell 4, adapted to be submerged in the water within the shell, forming a water seal, rising and falling with varying volumes of gas above the water-line and kept in alinement by a framework 5 and guiding-eyes 6 in engagement therewith.

The gas-inlet pipe 2 communicates with the base of a strainer and cooler 7, having a hollow interior 8 and consisting of inner and outer walls 9 10, between which is an intervening space filled with a straining substance, such as sand, gravel, charcoal, or other suitable material adapted to have a scouring effect on the gas. In the construction illustrated this strainer is cylindrical in form, mounted centrally of the holder on a supporting-base 11, resting on the floor, and provided with openings, so as to permit entrance of water to the interior of the cylinder. In this manner it will be seen that both the outer and inner surfaces of the cylinder are exposed to the cooling action of the water, so that as the gas passes upwardly through the straining substance it will be cooled at the same time. The space between the inner and outer walls is comparatively small, so that in its passage upwardly through the straining substance the gas will assume a cylindrical form, the walls being comparatively thin and exposed on each side to the cooling effect of the water, and as the cylinder is for the full length of the holder this cooling action will practically reduce the temperature of the gas to that of the water. This is a valuable advantage in apparatus of this class, as the best effects are secured by burning a cool gas, and by combining the cooling and scouring operations in the manner I have shown and described these results are obtained in a practicable and economical manner.

It will be understood that the construction, shape, and arrangement may be varied from the cylindrical form—as, for instance, the strainer and cooler may be square, oblong, or otherwise to suit conditions of use the essential requisite being that the inner and outer surfaces of the straining-material chamber shall be exposed to the cooling effect of the water or that the surfaces exposed to the water shall be closely adjacent to each other, as in the case of a closed shallow pan mounted on its edge or side, through which the gas will pass upwardly through a scouring substance.

What I claim is—

In acetylene-gas apparatus, in combination with a water-filled holder, an open-topped vertical cooling and straining chamber, extending above the water-surface, provided with closely adjacent inner and outer walls with a retaining-bottom, a scouring substance contained between the walls, a supporting-base, mounted on the floor of the holder, provided with openings providing communication for the water from the outer-holder cavity to the interior space within the inner cooling-chamber walls, a gas-inlet pipe connected with the bottom of the cooling-chamber, and an outlet-pipe for the gas, extending above the surface of the water and leading downwardly to the exterior of the holder, substantially as set forth.

In testimony whereof I affix my signature in presence of two witnesses.

GEORGE W. MacKENZIE.

Witnesses:
PETER J. EDWARDS,
C. M. CLARKE.